Figure 2:
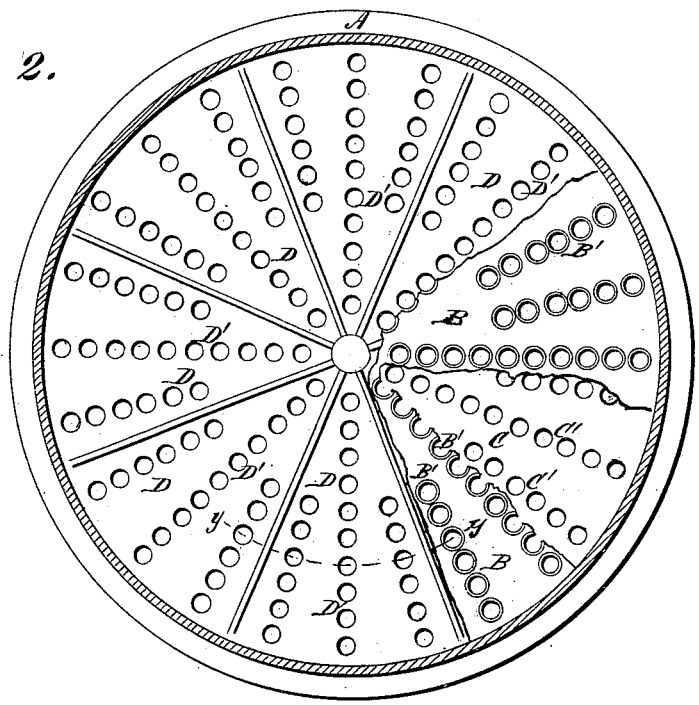

(No Model.)
3 Sheets—Sheet 1.
T. GAUNT.
BONE BLACK DISCHARGER FOR CONTINUOUS FILTERS.
No. 329,305. Patented Oct. 27, 1885.
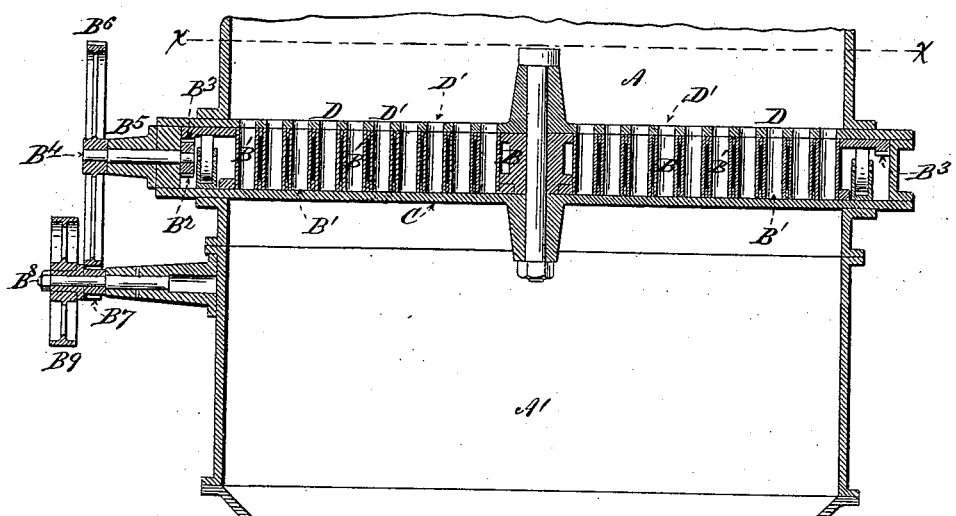
Fig. 1.
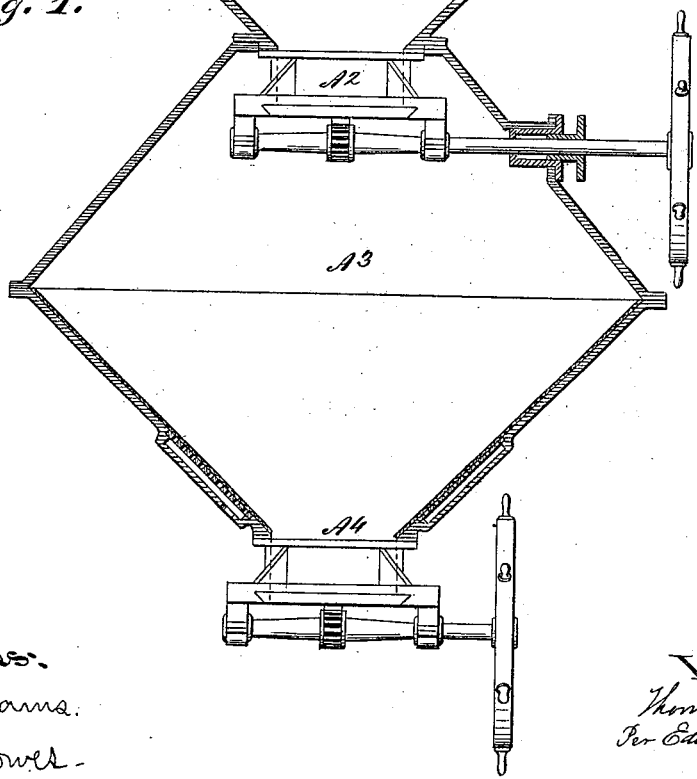
Witnesses:
M. L. Adams.
R. C. Howes.
Inventor:
Thomas Gaunt,
Per Edw. E. Quincy
atty.

(No Model.) 3 Sheets—Sheet 2.
T. GAUNT.
BONE BLACK DISCHARGER FOR CONTINUOUS FILTERS.
No. 329,305. Patented Oct. 27, 1885.

Witnesses:
M. L. Adams.
R. C. Howes.

Inventor:
Thomas Gaunt,
Per Edw. E. Quimby,
Atty.

(No Model.)  3 Sheets—Sheet 3.
T. GAUNT.
BONE BLACK DISCHARGER FOR CONTINUOUS FILTERS.
No. 329,305. Patented Oct. 27, 1885.
*Fig. 4.* *Fig. 6.*
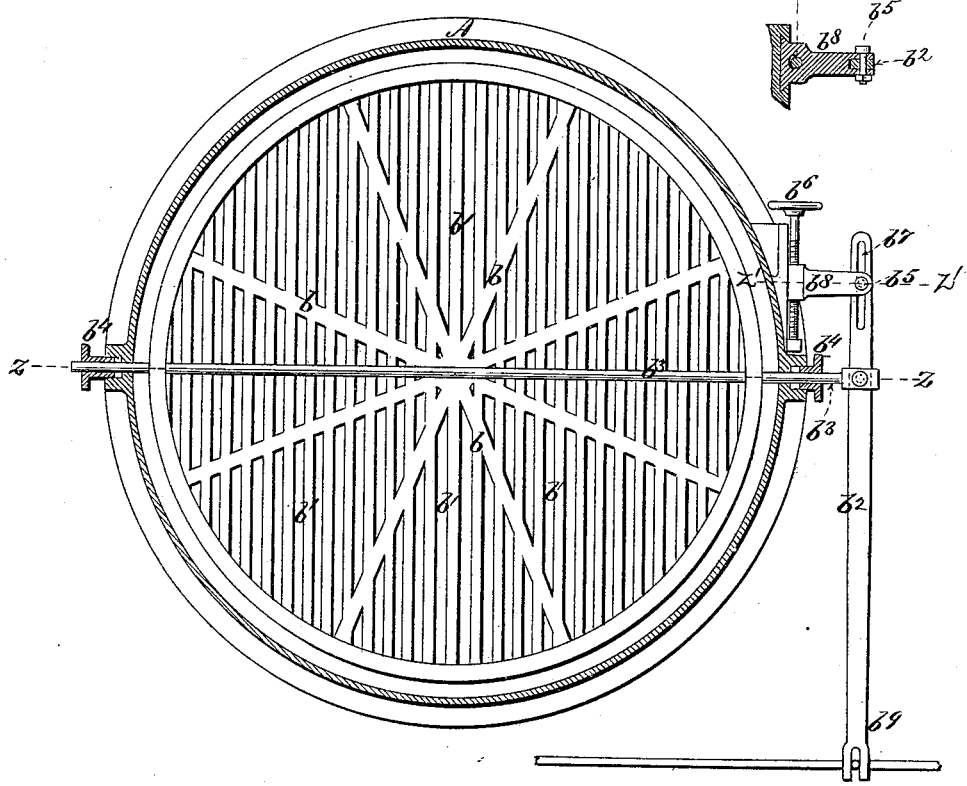
*Fig. 5.*
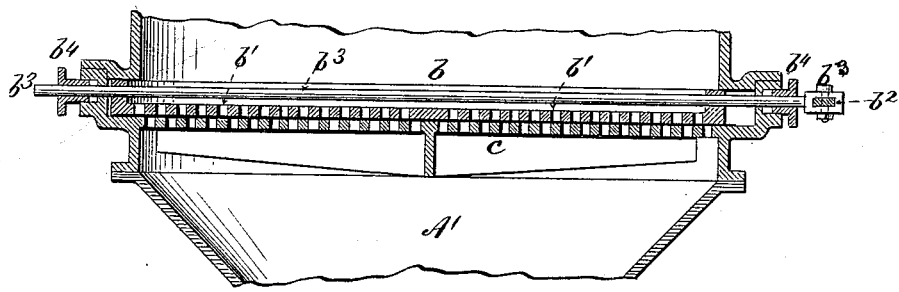
Witnesses:
M. L. Adams.
R. C. Howes.
Inventor:
Thomas Gaunt,
Per Edw. E. Quimby,
Atty.

UNITED STATES PATENT OFFICE.

THOMAS GAUNT, OF COLD SPRING, NEW YORK.

BONE-BLACK DISCHARGER FOR CONTINUOUS FILTERS.

SPECIFICATION forming part of Letters Patent No. 329,305, dated October 27, 1885.

Application filed June 18, 1885. Serial No. 169,048. (No model.)

*To all whom it may concern:*

Be it known that I, THOMAS GAUNT, of Cold Spring, New York, have invented a certain improvement in devices for removing filtering material from the bottom of chambers in which saccharine or other liquids are filtered by the process of upward filtration through bone-black or other filtering material, of which the following is a specification.

My invention consists in the provision, at the bottom of a filtering-chamber in which the process of upward filtration is practiced, of a movable horizontal diaphragm containing a series of openings, which may either be circular or slotted, and which is arranged immediately above a stationary horizontal diaphragm provided with a series of openings like those in the movable diaphragm. I may also provide immediately above the movable diaphragm another stationary horizontal diaphragm, also provided with a similar series of openings. In either case the openings in the movable diaphragm constitute chambers, into which the filtering material falls by its own gravity, and from which such filtering material is discharged when the openings in the movable diaphragm are moved into alignment with the openings in the stationary diaphragm beneath it. By means of this device I am enabled to remove the exhausted bone-black or other filtering material from all portions of the bottom of the mass of filtering material contained in the filtering-chamber, and I am also enabled to remove definite quantities of such exhausted filtering material at each motion of the movable diaphragm. For convenience, I designate the movable perforated diaphragm as the "discharger." The bone-black or other filtering material removed from the bottom of the mass of filtering material in the filtering-chamber by the operation of the discharger falls into a receiving chamber or chambers beneath the filtering-chamber, from which it is removed in any convenient way.

It will be understood that in the class of filtering apparatus to which my invention is applicable the liquor to be purified is introduced under pressure into the receiving chamber or chambers, and thence makes its way upward through the mass of filtering material in the filtering-chamber, and escapes therefrom after having passed through a column of bone-black or other filtering material of the required height.

Figure 3:
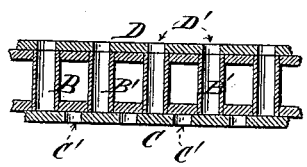

The accompanying drawings, showing the application of my improvements to filtering apparatus of the type in which saccharine or other liquids are purified by the process of upward filtration through bone-black or other filtering material, are as follows:

Figure 1 is a central vertical section of the lower portion of a filtering-chamber surmounting a receiving-chamber and a supplemental chamber into which the exhausted bone-black or other filtering material falls, and from which it is removed in any convenient way, showing that modification of my device in which the movable discharger contains a series of circular perforations, and has a rotating motion, and is arranged between two horizontal diaphragms, each containing a like series of circular perforations. Fig. 2 is a horizontal section through the line $x\,x$ on Fig. 1, showing a portion of the upper stationary perforated diaphragm broken away to afford a top view of a portion of the discharger. Fig. 3 is a vertical section on the curved line $y\,y$ on Fig. 2, showing the relative positions of the perforations in the two stationary diaphragms, and illustrating the manner in which the openings or tubes in the discharger are by the rotation of the discharger alternately brought into alignment with the openings in the upper stationary diaphragm, and then with the perforations in the lower stationary diaphragm. Fig. 4 is a top view of a reciprocating discharger, the openings in which consist of a series of parallel slots, which, by the reciprocating movements of the discharger, are alternately carried into and out of alignment with a like series of parallel slots in a stationary diaphragm arranged immediately beneath the discharger. Fig. 5 is a vertical section through the line $z\,z$ on Fig. 4, showing the discharger in the position in which it is out of alignment with the slots in the stationary diaphragm beneath it. Fig. 6 is a vertical section through the line $z'\,z'$ on Fig. 4.

The drawings represent the movable discharger B arranged horizontally across the bottom of the filtering-chamber A, and containing either a series of perforations or having inserted in it a series of short vertical tubes, B'. Immediately beneath the discharger is a stationary horizontal diaphragm, C, in which there are a series of perforations or openings, C', like the openings in the discharger, so that during the rotation of the discharger the openings or tubes B' are brought into alignment with the openings C' in the stationary perforated diaphragm C.

In the modification of my invention illustrated in Figs. 1, 2, and 3 another stationary perforated diaphragm, D, is arranged immediately above the discharger. The stationary diaphragm D is also provided with a series of openings, D', corresponding with those in the discharger. The holes D' in the upper stationary diaphragm are, as will be seen, not in alignment with the holes C' in the lower stationary diaphragm, and therefore the holes or tubes B' in the discharger, when in alignment with the holes D' in the upper stationary diaphragm, are not in alignment with the holes C', and while in such position opportunity is afforded for the filling of the tubes B' with the filtering material, which falls by its own gravity into the tubes, and when, by the further movement of the discharger, the holes B' are brought into alignment with the holes C' in the lower stationary diaphragm, the bone-black or other filtering material contained in the tubes B' falls by its own gravity into the receiving-chamber A', or, if the valve $A^2$ at the bottom of the receiving-chamber is open, the filtering material discharged by the discharger falls into the supplemental chamber $A^3$, from which it is to be removed by closing the valve $A^2$ and opening the valve $A^4$; or it may be removed in any other convenient way. The necessary rotating motion may be imparted to the discharger by means of the rotating spur-wheel $B^2$, engaging the teeth $B^3$, formed on the under side of the rim of the discharger, as shown. The spur-wheel $B^2$ is affixed to the inner end of the horizontal counter-shaft $B^4$, seated in a suitable bearing, $B^5$, and having affixed to its outer end the pinion $B^6$, which is driven by a spur-wheel, $B^7$, affixed to the horizontal shaft $B^8$, provided with the pulley $B^9$, for the reception of the driving-belt. The rotating motion of the discharger may either be intermittent or continuous, as desired.

In the modification of my invention shown in Figs. 4 and 5 the discharger has a reciprocating motion in a horizontal plane. In this case the discharger $b$ is provided with a series of parallel slots, $b'$, and a similar series of slots is also provided in a stationary diaphragm, $c$, beneath the discharger; and if a stationary diaphragm is employed above the discharger, as illustrated in Fig. 1, that also is provided with a similar series of parallel slots. Reciprocating motion is given to the discharger $b$ by means of the lever $b^2$, which is pivotally connected with the bar $b^3$. The bar $b^3$ is fastened to the discharger, and at its opposite ends extends outward through suitably-packed bearings $b^4$ $b^4$. The fulcrum end of the lever $b^2$ is provided with a slot, $b^7$, to permit the adjustment of the fulcrum-pin $b^5$, which, by means of the horizontal adjusting-screw $b^6$, acting upon the horizontally-sliding carriage $b^8$, may be moved toward or from the pivotal connection of the lever with the bar $b^3$. The lever is swayed to and fro in a horizontal plane by power applied, either manually or otherwise, to its free end $b^9$. In this modification, as in the other, the slots or openings in the discharger are filled with bone-black or other filtering material, which falls into them from the mass of filtering material in the filtering-chamber, and discharge their contents when they are brought into alignment with the openings in the lower stationary diaphragm. It will of course be seen that the motions of the discharger in the modification shown in Figs. 4 and 5 may be so regulated that there will be just time to discharge the contents of the openings in the discharger while those openings are being moved into or out of alignment with the openings in the stationary diaphragm beneath the discharger, so that substantially the same result may be obtained as regards the discharge of measured quantities of filtering material, whether the upper stationary diaphragm be employed or not.

I claim as my invention—

In filtering apparatus for purifying saccharine or other liquids by the process of upward filtration through bone-black or other filtering material, a discharger for discharging definite quantities of filtering material from the bottom of the filtering-chamber, consisting, essentially, of a movable horizontal diaphragm provided with a series of perforations, in combination with and superposed upon a stationary horizontal diaphragm provided with a like series of perforations, and means for moving the said discharger, for the purpose of moving its perforations alternately into and out of vertical alignment with the perforations of the said stationary diaphragm beneath it, substantially as described.

THOMAS GAUNT.

Witnesses:
R. C. HOWES,
M. L. ADAMS.